United States Patent [19]
Lewis

[11] Patent Number: 5,975,248
[45] Date of Patent: Nov. 2, 1999

[54] COMMUNICATIONS SYSTEM

[75] Inventor: David Llewellyn Lewis, Harlow, United Kingdom

[73] Assignee: Drucegrove Limited, Essex, United Kingdom

[21] Appl. No.: 08/980,223

[22] Filed: Nov. 28, 1997

Related U.S. Application Data

[63] Continuation-in-part of application No. 08/528,545, Sep. 15, 1995, abandoned.

[30] Foreign Application Priority Data

Aug. 11, 1995 [GB] United Kingdom .................... 9516519

[51] Int. Cl.$^6$ ........................................................ B66B 3/00
[52] U.S. Cl. ................................................................ 187/391
[58] Field of Search ..................................... 187/391, 393, 187/380, 247, 397; 379/66

[56] References Cited

U.S. PATENT DOCUMENTS

| | | | |
|---|---|---|---|
| 4,402,073 | 8/1983 | Hammond | 370/9 |
| 4,683,989 | 8/1987 | Pillage . | |
| 4,872,532 | 10/1989 | Tobita et al. | 187/121 |
| 4,992,774 | 2/1991 | McCullough . | |
| 5,325,022 | 6/1994 | Proctor | 315/129 |
| 5,445,245 | 8/1995 | Ketoviita | 187/391 |
| 5,530,737 | 6/1996 | Bartholomew et al. | 379/62 |

FOREIGN PATENT DOCUMENTS

| | | | |
|---|---|---|---|
| 0 612 161 A3 | 8/1994 | European Pat. Off. | H04B 3/54 |
| 2 149 146 | 6/1985 | United Kingdom | B66B 3/00 |
| 2 149 546 | 6/1985 | United Kingdom | B66B 3/02 |
| 2 149 626 | 6/1985 | United Kingdom | H04L 11/16 |
| WO 80/02631 | 11/1980 | WIPO | H04Q 9/00 |
| WO 93/08652 | 4/1993 | WIPO | H04B 3/54 |

*Primary Examiner*—Jonathan Salata
*Attorney, Agent, or Firm*—Deveau, Colton & Marquis

[57] ABSTRACT

A communications system for an elevator system has a master control unit located close to the lift controller and connected via a bus to a number of local modules, each connected to one or more announcement devices. The announcement devices may be of various types including alphanumeric display of elevator position or other messages, lanterns indicating direction of travel, electronic gongs and passing chimes. The bus consists of only two conductors which carry both power and output signals from the master control unit to the respective local modules, the signals being encoded by modulation of the power supplied. The system reduces the amount of wiring required for new installations of elevator systems and also facilitates retrofitting to existing systems to install dot matrix display devices or audible announcement devices without the need for additional wiring.

14 Claims, 5 Drawing Sheets

COMMUNICATIONS SYSTEM

This application is a continuation-in-part of application Ser. No. 08/528,545, filed Sep. 15, 1995, now abandoned.

BACKGROUND AND FIELD OF THE INVENTION

This invention relates to communications systems for providing announcements at locations served by a conveying system to indicate the status of a moveable conveyance of the system and in particular has application to an elevator indicator system for providing visible and/or audible announcements at landings served by the elevator as to the status of an elevator car.

It is known to provide visible indicators at landings of a building provided with an elevator in order to indicate to a user the current status of an elevator car, typically a numerical display indicating the current position of the car by reference to the number of the landing at which it is positioned. Additional announcements are also known to be provided by means of an audible gong indicating the arrival or departure of a car from a particular landing and the provision of a visible hall lantern which illuminates to indicate an up or down arrow indicating the direction of travel of the car.

The control of such announcement devices is generally effected by means of a master control unit located at a control station where the operation of the car is also controlled. Communication between the master control unit and each of the announcement devices in many installations entails a wiring loom installed in an elevator shaft in which the car operates, the wiring loom having a large number of conductors with a respective set of conductors provided for each announcement device. Where an announcement device provides a visible indication of the current position of the car, a known system provides a separate lamp to be selectively illuminated for each of the characters of an alphanumerical display corresponding to the possible car positions and for each lamp to require separate conductors to energise the lamp. Such multiple lamp display greatly increase the number of conductors required in the wiring loom.

Recent improvements have resulted in the use of LED dot matrix displays for alphanumeric announcements using a matrix of lights which can be controlled by a driving circuit in respect to serially encoded data, thereby significantly reducing the number of conductors and hence simplifying the wiring loom.

A problem still remains in that such existing systems require a minimum of three conductors to power and control the driving circuit.

SUMMARY OF THE INVENTION

It is an object of the present invention to provide a communications system in which the number of conductors required to power and control the driving circuit is reduced to two.

It is an additional object of the present invention to provide an improved elevator indicator system for use either in a new installation or in retrofitting to an existing installation with the minimum of wiring.

The present invention provides a communications system for providing announcements at a plurality of locations served by a conveying system to indicate the status of a moveable conveyance of the conveying system, the communications system comprising;

a master control unit operable to provide output signals representative of the status of the conveyance and to output electrical power;

a plurality of local modules deployed at the locations and each responsive to the output signals to generate local output signals specific to the respective location at which the local module is deployed;

a bus connecting the local modules to the master control unit so as to conduct power therefrom;

respective first and second terminals of each local module being connected to the bus so as to receive power therefrom;

a plurality of announcement devices each being operatively connected to respective one of the local modules and responsive to a respective local output signals to provide an announcement;

and wherein the master control unit is operable to provide output signals by modulation of the power supplied via the bus whereby each local module receives via its respective first and second terminals both the output signals and power for the operation of the local module and the announcement device to which it is connected.

An advantage of such a system is that a two wire bus may be utilised to both power and control announcement devices thereby reducing the number of conductors required in a wiring loom.

Preferably at least one of the local modules is connected to at least one additional announcement device responsive to respective additional local output signals from the local module. An advantage of such a system is that the additional announcement devices need not be specifically adapted to operate from a two wire bus and may for example be conventional lamps or electronic gongs. This is particularly useful when retrofitting to existing systems where multiple lamp displays are to be replaced by an announcement device driven by a local module connected to the two wire bus, existing conventional additional announcement devices then remaining in situ if desired and driven by outputs from the local module whereas previously they were energised by separate dedicated wires of the wiring loom.

Where for example the communications system is installed in an elevator system in which announcements concerning the status of an elevator car are to be indicated to users, it will be convenient for each local module to be housed integrally with a dot matrix display and for any additional announcement devices such as hall lanterns and electronic gongs to be connected to additional external outputs of the local module. This removes the need for each of the additional announcement devices to be provided with its own separate processor connected to the bus thereby reducing cost, such additional announcement devices typically being located in proximity to one another and to the visible display.

Alternatively, at least one announcement device (or additional announcement device) may be an audible announcement device operable to deliver synthesized speech messages.

In a preferred embodiment, the bus comprises a first conductor carrying a power supply voltage from the master control unit and a second conductor being maintained at earth potential, the master control unit being operable to provide output signals by pulse modulation of the power supply voltage between a DC level and earth potential. p An advantage of modulating the supply voltage to earth potential is that data corruption is minimised when decoding the signal at the local module.

Preferably the master control unit is operable to encode the output signals by pulse width modulation.

BRIEF DESCRIPTION OF THE DRAWINGS

The foregoing and other objects and advantages of the present invention will become more readily apparent from the following detailed description, as taken in conjunction with the accompanying drawings wherein.

DETAILED DESCRIPTION

Figure 1:
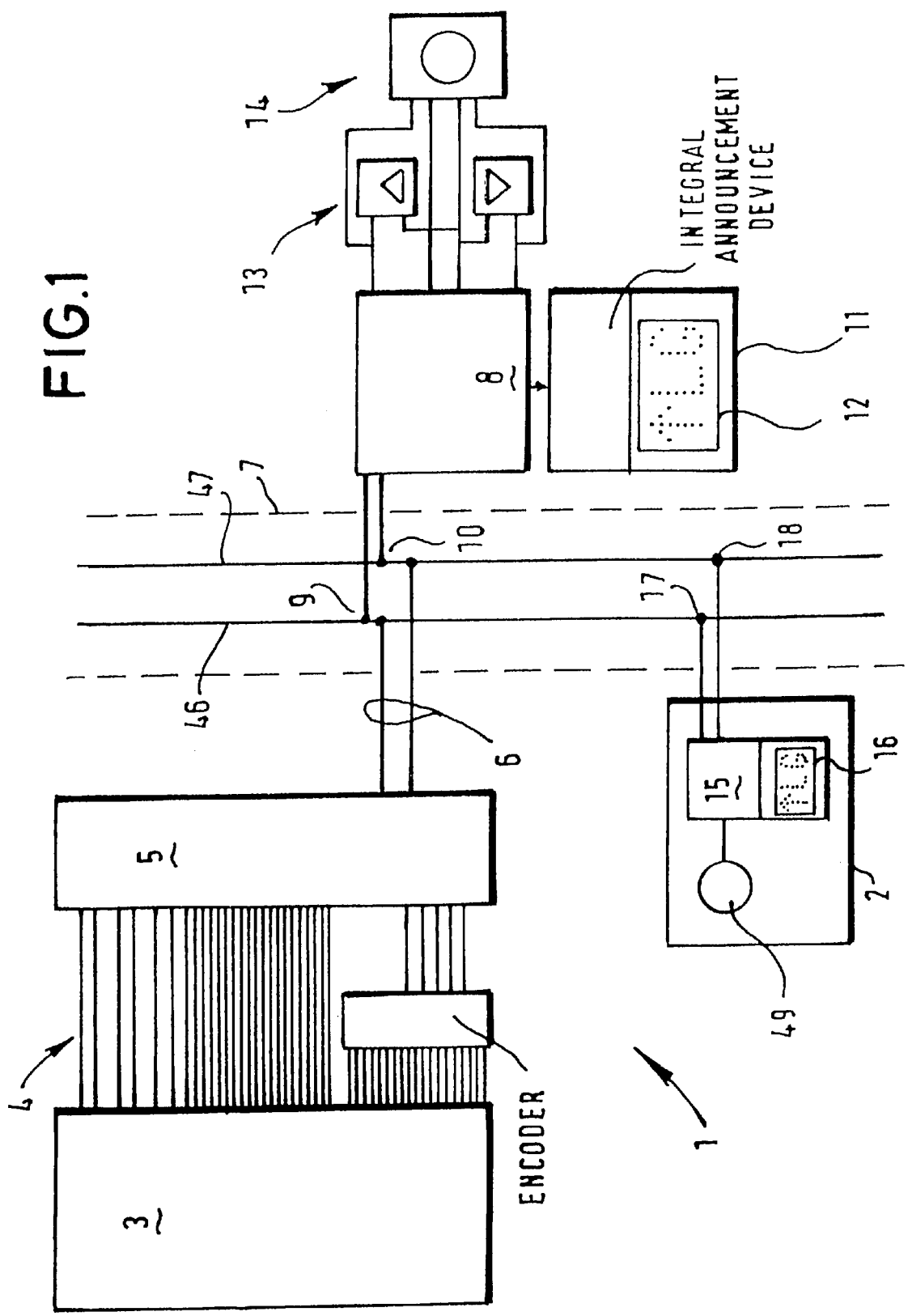
FIG. 1 is a schematic diagram of a communications system for an elevator.

In FIG. 1 a communications system 1 for an elevator provides announcements at a plurality of landings served by the elevator as to the status of an elevator car 2. Movement of the car 2 is controlled by operation of a lift controller 3 at a lift control station and status signals 4 are sent by the lift controller to a master control unit 5 of the communications system 1.

A two wire bus 6 carries the output of the master control unit 5 and is incorporated in a wiring loom 7 which extends vertically through an elevator shaft within which the car 2 operates. Each landing served by the elevator is provided with a local module 8 which receives both electrical power and serially encoded data via first and second terminals 9 and 10 connected to respective conductors 46 and 47 of the bus 6.

Figure 3:
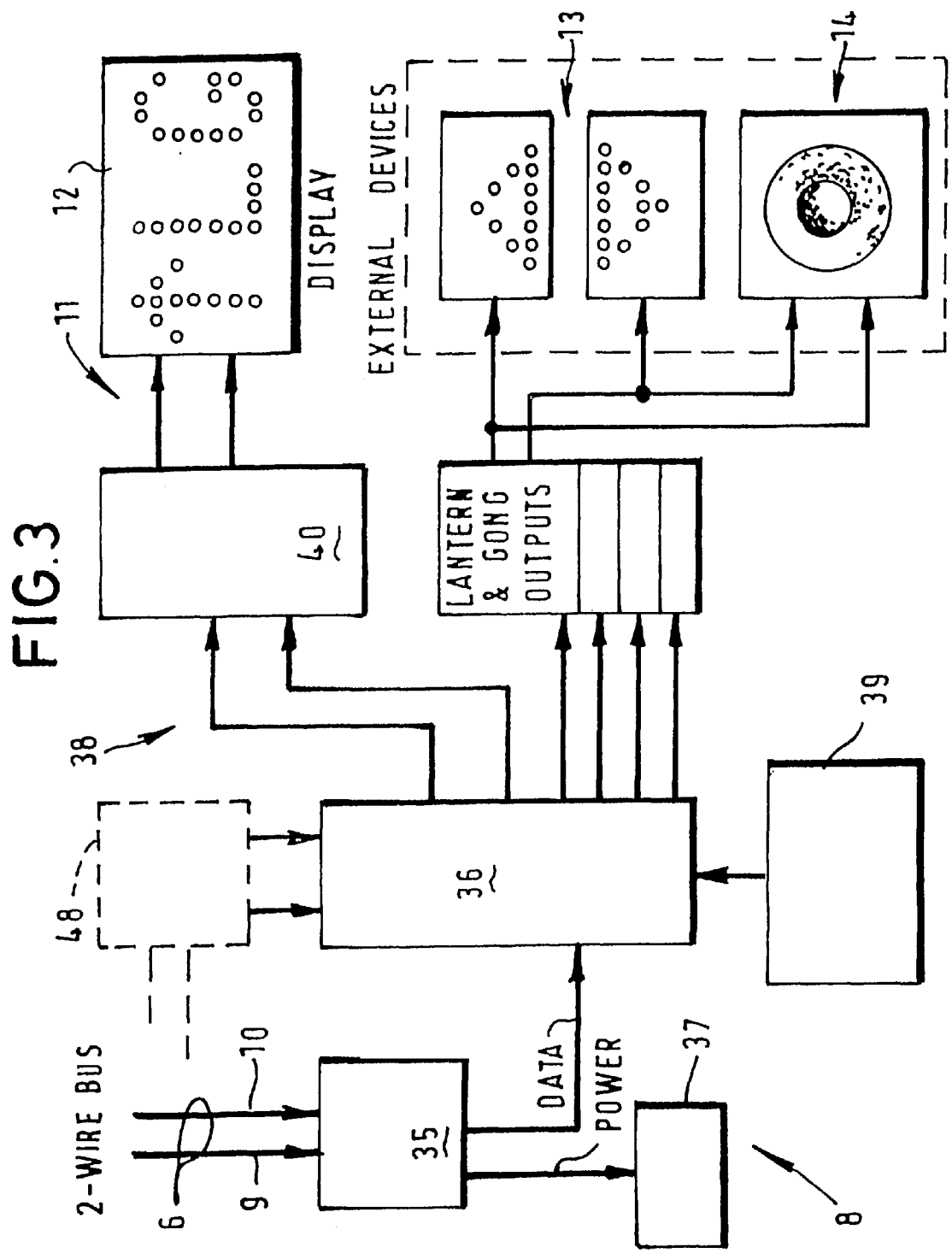
FIG. 3 is a schematic diagram of a local module of the system of FIG. 1 showing connection to both an integral announcement device and external announcement devices.

In the example shown in FIG. 3, the local module 8 is provided with an integral announcement device 11 which is housed integrally with the local module 8 as a single unit and which incorporates an LED display 13 operable to visibly display alpha numeric information and direction indications (up and down arrows) to indicate the position and direction of travel of the car 2.

The local module 8 is also connected to, and controls the operation of, a first external announcement device 13 in the form of a hall lantern providing up and down directional arrows indicative of car movement and a second external announcement device 14 constituted by an electronic arrival/ departure gong which sounds whenever the elevator car arrives or departs from the landing at which the local module 8 is situated.

The car is provided with an onboard local module 15, corresponding in structure to the local module 8, and provided with an integral announcement device 16 constituted by a LED display of direction and car position. A passing chime device 49 is also connected to the local module 15 and provides on audible indication each time a floor is passed, thereby enabling blind persons to determine position by counting floors.

The onboard local module 15 is connected via terminals 17 and 18 to the bus 6 to receive both power and serially encoded data from the master control unit 5.

Figure 2:
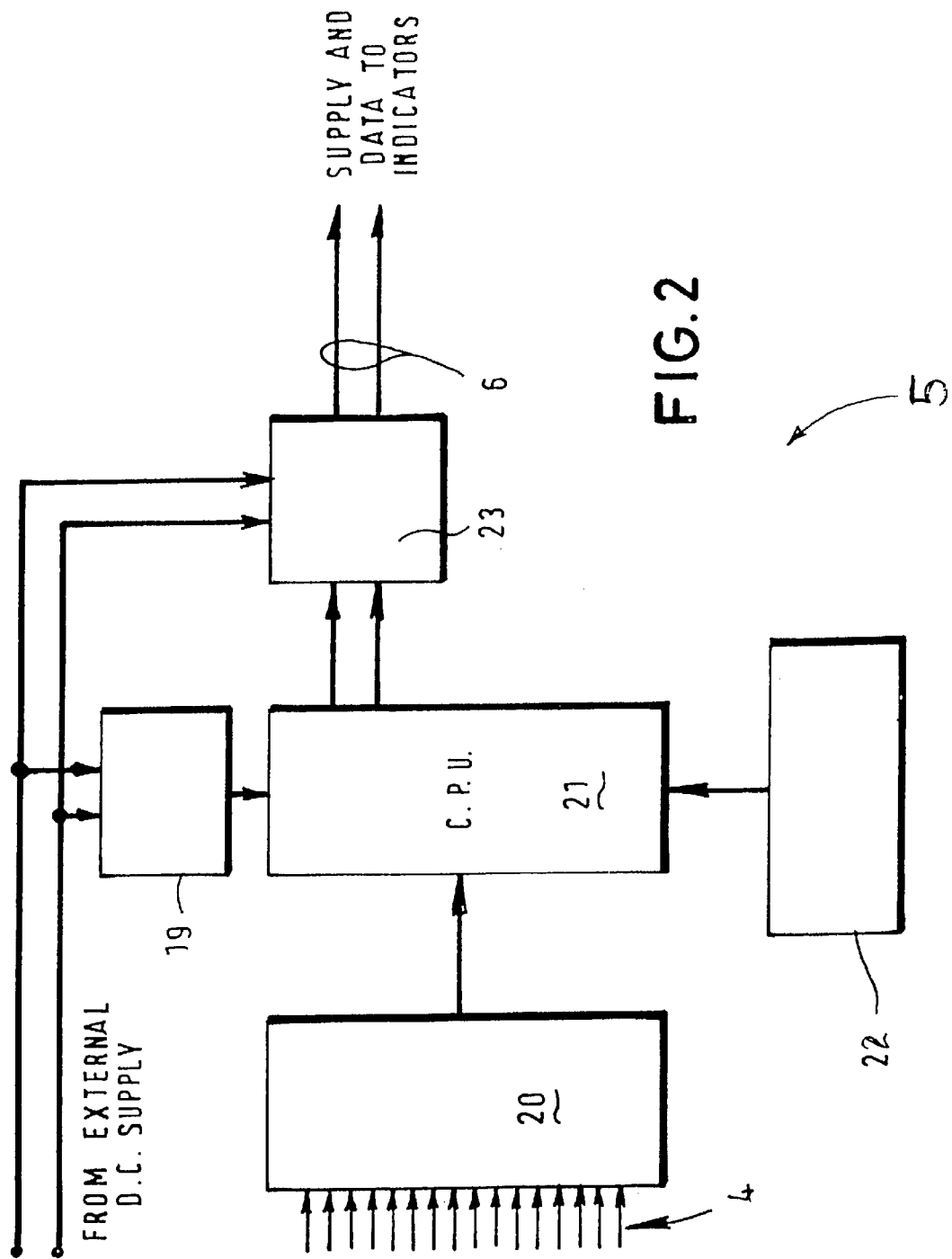
FIG. 2 is a schematic diagram of the master control unit of the system of FIG. 1.

FIG. 2 shows schematically the operation of the master control unit 5 which receives electrical power from a power supply 19 and status signals 4 from the lift controller 3 which are received by input circuits 20 of a processor 21. A user input 22 incorporating manually operable switches is connected to the processor 21 to enable optional features of the system such as scrolling of dot matrix displays to be selected by a user.

Figure 4:
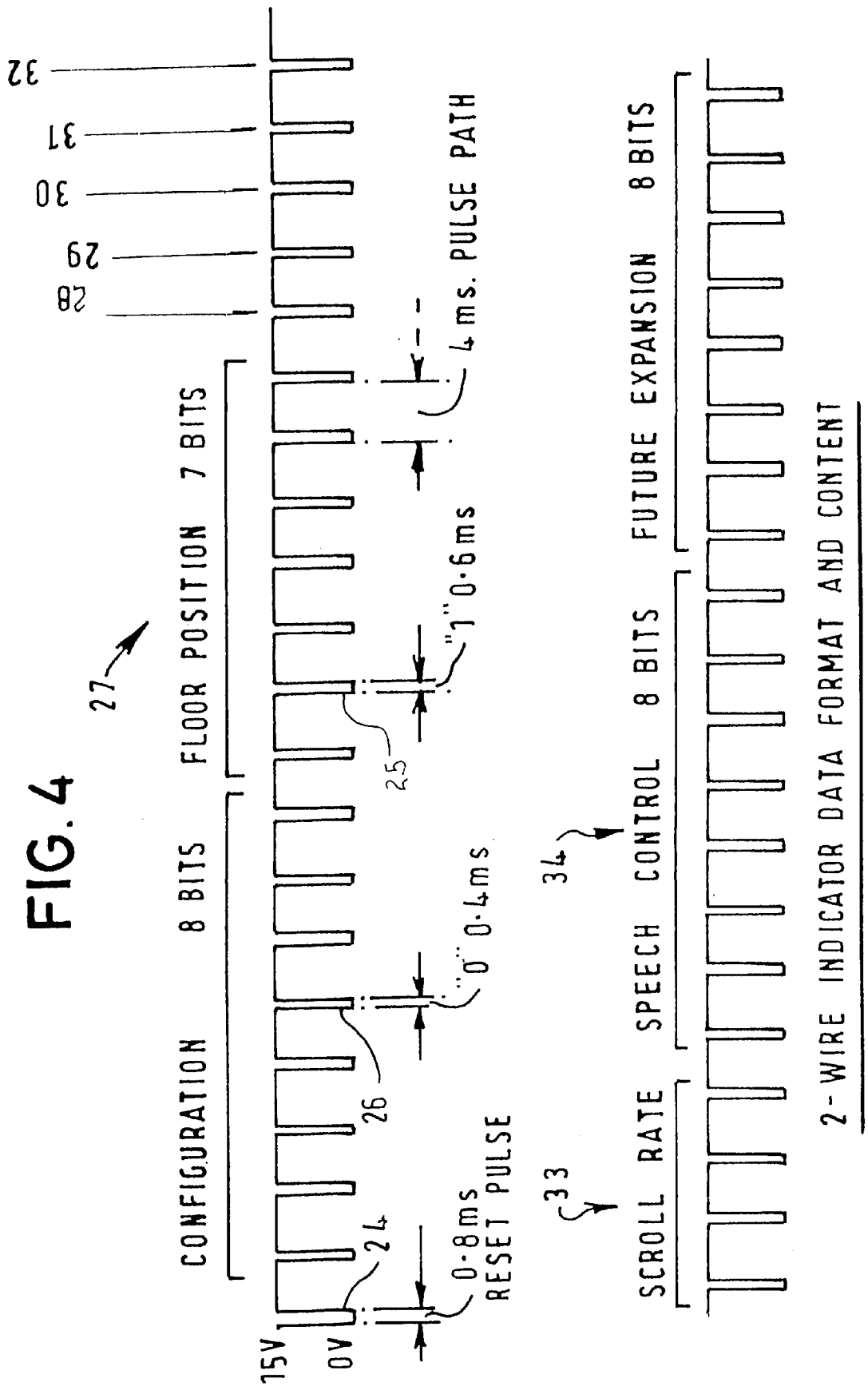
FIG. 4 is a schematic representation of the format of serially encoded data carried by the bus between the master control unit and the local modules.

The processor 21 is pre-programmed to control the operation of an encoder 23 which modulates power delivered from the power supply 19 to bus 6 such that serially encoded data is transmitted via the bus in the form of interruptions to the power supply voltage appearing across the two conductors 46, 47 of the bus using pulse width modulation. As shown in FIG. 4, data is encoded in data streams consisting of forth-one bits, the length of supply interruption determining whether a bit represents binary 1 or 0 or RESET. In FIG. 4, a data stream commences with a RESET pulse 24 of 0.8 milliseconds duration, a binary 1 pulse 25 being represented by an interruption of 0.6 milliseconds and a binary 0 pulse 26 being represented by an interruption of 0.4 milliseconds.

Pulses are transmitted every 4 milliseconds.

The data stream includes a floor position word 27 comprising seven bits identifying the current location of the car 2, a chime enable word 28 comprising a single bit instructing the passing chime 49 to chime, car direction words 29 and 30 representing up and down respectively to identify the current car direction, and hall lantern words 31 and 32 representing up and down respectively for controlling the hall lantern 13.

The data stream further includes a scroll rate word 33 providing data for controlling the rate at which LED displays 13 are operable to scroll alphanumerical information.

A speech control word 34 is also provided to enable audible announcement devices synthesizing speech to be controlled.

FIG. 3 illustrates the structure of a local module 8 having an integral announcement device 12 providing a visible display by means of an LED display 12. The local module 8 is also illustrated in FIG. 3 as being connected to first and second external announcement devices 13 and 14 constituted by a hall lantern and an electronic gong. The local module 8 may also optionally be connected to local inputs 48 so as to receive additional signals for controlling any one of external devices under the control of the local module. This has application to retrofitting to existing systems where additional wiring from the master control unit 5 already exists for the purpose of driving an external device and it is desired for convenience to utilise the existing wiring as local inputs 48 to input additional signals to the processor unit 36.

The local module 8 comprises terminals 9 and 10 connected to the bus 6 connected to a decoder 35 operable to extract the serially encoded data carried by the bus 2 and input the data to a processor unit 36, the power received by the decoder being smoothed by a power supply unit 37 operable to output continuous uninterrupted power to the electronic components of the local module 8.

The processor unit 36 is pre-programmed to output appropriate control signals 38 to the integral announcement device 11 and the external devices 13 and 14 in response to the received serially encoded data stream and dependent on additional parameters pre-set at the time of installation by means of a pre-setting switch unit 39. The pre setting switch unit 39 is used to set up a parameter indicating the number of the landing at which the local module 8 is located (or to indicate that the local module is on board the car) and also to set other parameters determining optional modes of operation provided for in the software of the processor unit 36.

As shown in FIG. 3, the integral announcement device 11 consists of a display driving circuit 40 receiving command signals from the processing unit 36 and connected to the LED display 12. The LED display 12 is a dot matrix indicator with the facility to display alphanumerical characters to represent the position of the elevator car. The flexibility or such displays allows a number of optional features to be utilised in announcements. The LED display 12 may incorporate arrows indicating the next direction of travel of the car, thereby in effect removing the need for a separate hall lantern, this direction information being displayed in place of the position indication whenever the car arrives at the landing at which the local module 8 is located. The display 12 may also incorporate, as shown in FIG. 3, an integral car direction display showing the actual direction of car travel in addition to the current position announcement.

The display 12 may either be arranged to sequentially indicate the landing served by the car or may incorporate the vertical scrolling of characters identifying car position, thereby simultaneously indicating the direction of travel of the car. Horizontal scrolling of information is also possible and may be utilised to provide information messages such as "lift out of service".

The user input 22 described with reference to FIG. 2 above may optionally be used to select pre-programmed information messages to be scrolled in this manner.

Figure 5:
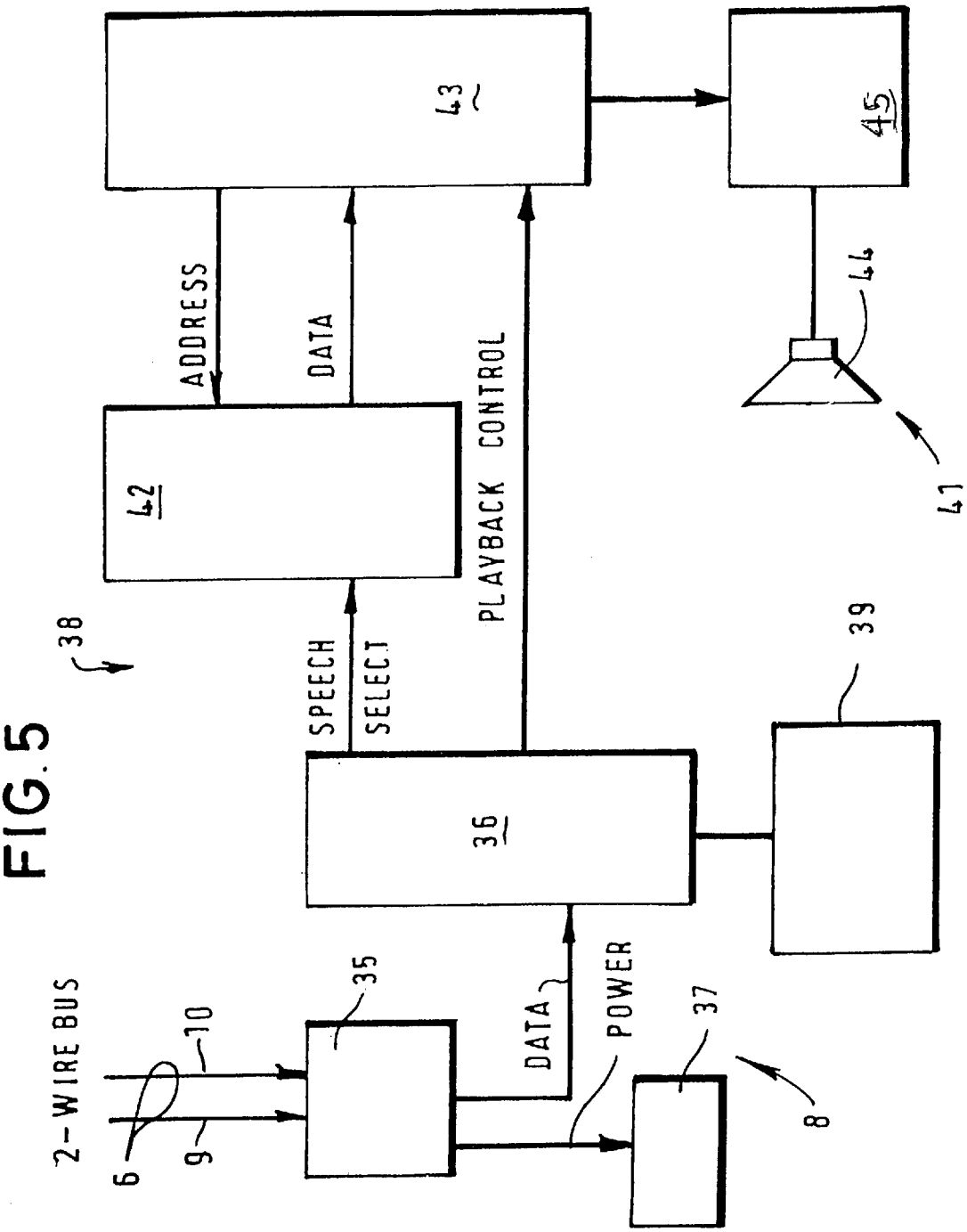
FIG. 5 is a schematic diagram of a local module having an integral announcement device for providing an audible announcement.

FIG. 5 illustrates schematically a local module 8 provided with an alternative integral announcement device 41 which is an audible announcement device operable to deliver synthesized speech messages in response to data transmitted in the speech control word 34 of the data stream. A speech data memory 42 is addressed by the processor unit 36 and data output from the speech data memory is used to synthesize speech via a speech playback device 43 which outputs an audio signal driving a speaker 44 via an audio amplifier 45.

The bus 6 comprises first and second conductors 46 and 47 respectively, typically being constituted by a pair of wires of the wiring loom 7, the first conductor carrying a supply voltage which is modulated as described above and the second conductor being permanently maintained at earth potential. The encoder 23 described above with reference to FIG. 2 is operable to modulate the supply voltage such that the first conductor is held at earth potential throughout each of the reset pulse 24, the binary 1 pulse 25 and the binary 0 pulse 26. This reduces the likelihood of data corruption by the pick up of noise which might otherwise occur if the first conductor were modulated to a floating voltage, this being an important consideration in the environment of an elevator system where high transient currents associated with the lift motor are encountered.

The relatively slow rate of switching of the supply voltage by the encoder 23 allows high frequency switching noise and other spikes to be filtered from the signal data and also removes the need for any specialised transmission line to be provided, a pair of wires such as normally utilised for the power supply being adequate for the supply of signals.

The communications system of the present invention is primarily intended for use in elevator systems but also has application to other forms of transit systems such as trains, monorail systems and other public service transport systems.

The communications system described in the preferred embodiment above may be modified to operate using different formats of signal modulation in which specifically the data rate, pulse width and data stream length may be varied. In certain situations, particularly when retrofitting to existing systems, it will not be appropriate for any of the local modules to be housed integrally with a respective announcement device since connection to existing external announcement devices will be required.

What is claimed is:

1. A communications system for providing announcements at a plurality of locations served by a conveying system to indicate the status of a moveable conveyance of the conveying system, The communications system comprising:
a master control unit operable to provide output signals representative of the status of the conveyance and to output electrical power;
a plurality of local modules deployed at the locations and each responsive to the output signals to generate local output signals specific to the respective location at which the local module is deployed;
a bus connecting the local modules to the master control unit so as to conduct power and to transmit output signals to the local modules;
respective first and second terminals of each local module being connected to the bus so as to receive power and output signals from the bus;
and wherein the output signals provided by the master control unit comprise a series of power interruptions with the reset status having a power interruption of one duration, with a power interruption of a second duration representing a binary "0" and a power interruption of a third duration representing a binary "1", the first, second and third durations being different from each other to convey bits of information and to allow the reset status to indicate the start of a series of power interruptions.

2. A communications system as claimed in claim 1 wherein at least one local module is housed integrally with a respective announcement device constituted by a dot matrix display.

3. A communications system as claimed in claim 1 further comprising a local module mounted in the conveyance and operatively connected to an announcement device constituted by a dot matrix display.

4. A communications system as claimed in claim 1 wherein the conveyance comprises an elevator car of an elevator system for conveying between landings of a building, said landings constituting the locations at which the local modules are located.

5. A communications system as claimed in claim 2 wherein the conveyance comprises an elevator car of an elevator system for conveying between landings of a building, said landings constituting the locations at which the local modules are located, and wherein at least one additional announcement device is constituted by a hall lantern or an electronic gong.

6. A communications system as claimed in claim 1 wherein at least one announcement device is constituted by all audible announcement device operable to deliver synthesized speech messages.

7. A method of operating a communications system to provide announcements at a plurality of locations served by a conveying system to indicate the status of a moveable conveyance of the conveying system;

the communications system comprising:
a master control unit;
a plurality of local modules deployed at the locations;

a bus connecting the local modules to the master control unit;

respective first and second terminals of each local module being connected to the bus; and a plurality of announcement devices each being operatively connected to respective one of the local modules;

said method comprising the steps of:
> operating the master control unit to provide output signals representative of the status of the conveyance and to output electrical power;
>
> operating the local modules in response to the output signals to generate local output signals specific to the respective location at which the local module is deployed;
>
> conducting power and broadcasting the output signals to the local modules from the master control unit via the bus;

wherein the output signals comprise a series of power interruptions with the reset status having a power interruption of one duration, with a power interruption of a second duration representing a binary "0" and a power interruption of a third duration representing a binary "1", the first, second and third durations being different from each other to convey bits of information and to allow the reset status to indicate the start of a series of power interruptions.

8. The communications system of claim 1 wherein said series of data pulses are divided into a plurality of groups each forming a word having a specified number of bits.

9. The communications system of claim 8 wherein said words comprise a first word representing the location of the conveyance.

10. The communications system of claim 9 further comprising a plurality of announcement devices each being operatively connected to respective one of the local modules and responsive to respective local output signals to provide an announcement, and said series of data pulses containing a group of pulses forming a second word for enabling each of said announcement devices.

11. The method of claim 9 wherein said series of data pulses are divided into a plurality of groups each forming a word having a specified number of bits.

12. The method of claim 11 wherein said words comprise a first word representing the location of the conveyance.

13. The method of claim 9 wherein said communications system further comprises a plurality of announcement devices each being operatively connected to respective one of the local modules.

14. A communications system as claimed in claim 1 wherein the bus comprises a first conductor carrying a power supply voltage from the master control unit and a second conductor being maintained at earth potential, the master control unit being operable to provide output signals by pulse modulation of the power supply voltage between a DC level and earth potential.

* * * * *